United States Patent
Rathus et al.

(10) Patent No.: US 7,929,946 B2
(45) Date of Patent: Apr. 19, 2011

(54) REMOTE SUBSCRIBER IDENTIFICATION (RSID) SYSTEM AND METHOD

(76) Inventors: Spencer A. Rathus, New York, NY (US); Hanna Bondarik, Highland Park, NJ (US)

( * ) Notice: Subject to any disclaimer, the term of this patent is extended or adjusted under 35 U.S.C. 154(b) by 1160 days.

(21) Appl. No.: 11/135,939

(22) Filed: May 24, 2005

(65) Prior Publication Data

US 2006/0285663 A1  Dec. 21, 2006

(51) Int. Cl.
*H04M 1/66* (2006.01)

(52) U.S. Cl. .... 455/411; 340/5.81; 370/352; 379/88.01; 379/168; 379/189; 379/201.05; 379/201.12; 455/414.1; 455/418; 455/463; 709/203; 709/219; 709/229; 709/232

(58) Field of Classification Search .......... 340/5.8–5.86; 370/351–356; 379/88.01–88.04, 88.13, 88.14, 379/88.17, 157, 167.02, 168, 189, 194–195, 379/201.05, 201.12; 455/410, 411, 414.1, 455/418–420, 461, 463, 556.2; 704/270; 709/203, 219, 229, 232

See application file for complete search history.

(56) References Cited

U.S. PATENT DOCUMENTS

| | | | | |
|---|---|---|---|---|
| 5,644,711 | A * | 7/1997 | Murphy | 726/2 |
| 5,900,875 | A * | 5/1999 | Haitani et al. | 715/840 |
| 6,006,274 | A * | 12/1999 | Hawkins et al. | 709/248 |
| 6,300,946 | B1 * | 10/2001 | Lincke et al. | 715/700 |
| 6,973,299 | B2 * | 12/2005 | Apfel | 455/412.2 |
| 7,007,068 | B2 * | 2/2006 | Morkel | 709/206 |
| 7,039,177 | B1 * | 5/2006 | Smith et al. | 379/355.03 |
| 7,054,624 | B2 * | 5/2006 | Cocita | 455/419 |
| 7,092,699 | B1 * | 8/2006 | Hefter | 455/414.1 |
| 7,187,932 | B1 * | 3/2007 | Barchi | 455/445 |
| 7,203,505 | B1 * | 4/2007 | Larikka et al. | 455/466 |
| 7,317,907 | B2 * | 1/2008 | Linkert et al. | 455/412.1 |
| 7,317,919 | B1 * | 1/2008 | Ruf | 455/446 |
| 7,349,907 | B2 * | 3/2008 | Celik | 707/10 |
| 7,376,445 | B2 * | 5/2008 | Nakayama | 455/558 |
| 7,526,275 | B2 * | 4/2009 | Kokubo | 455/411 |
| 2002/0049610 | A1 * | 4/2002 | Gropper | 705/1 |
| 2002/0069298 | A1 * | 6/2002 | Birkler et al. | 709/248 |
| 2002/0103005 | A1 * | 8/2002 | Watts et al. | 455/556 |
| 2002/0165008 | A1 * | 11/2002 | Sashihara et al. | 455/558 |
| 2003/0023759 | A1 * | 1/2003 | Littleton et al. | 709/248 |
| 2004/0157590 | A1 * | 8/2004 | Lazaridis et al. | 455/415 |
| 2004/0219928 | A1 * | 11/2004 | Deeds | 455/456.1 |
| 2004/0224675 | A1 * | 11/2004 | Puskoor et al. | 455/419 |
| 2005/0070276 | A1 * | 3/2005 | McGarry | 455/432.2 |
| 2005/0136979 | A1 * | 6/2005 | Dietl et al. | 455/558 |
| 2005/0186989 | A1 * | 8/2005 | Cocita | 455/558 |
| 2006/0026198 | A1 * | 2/2006 | Emery et al. | 707/103 R |
| 2006/0079204 | A1 * | 4/2006 | Pon et al. | 455/411 |

* cited by examiner

*Primary Examiner* — Hemant Patel
(74) *Attorney, Agent, or Firm* — Ward & Olivo

(57) ABSTRACT

The present invention discloses a Remote Subscriber Identification (RSID) system with a remote database capable of seamlessly storing, linking, and transferring mobile data to a user's communication device. The user's data can be used on any communication device that capable of recognizing personal identifying information, transmitting this information to the remote database, accessing the user's subscriber specification information and any subscriber personalized information, and transmitting it to the user's communication device, enabling the user to use this information with the communication device.

33 Claims, 12 Drawing Sheets

REMOTE SUBSCRIBER IDENTIFICATION (RSID) SYSTEM AND METHOD

FIELD OF THE INVENTION

The disclosed invention relates to the field of communications. It describes a Remote Subscriber Identification (RSID) system which comprises a remote database capable of seamlessly storing, linking, and transferring mobile data to a communication device.

BACKGROUND OF THE INVENTION

Mobile wireless communication is advancing with capabilities of storing large amount data in smaller and faster electronic chips. The original communication devices stored mobile data on embedded memory chips. However, as the use of mobile devices increased, users utilized the devices as information storage source. Phonebook and calendar records went from being kept on paper to strictly being stored on mobile devices. This caused a problem through persistent introduction of new mobile phones and better subscription plans each year, while lucking in easy data transfer and guaranteed data security.

The versatility of a Subscriber Identity Module (SIM) card provided the subscriber to be independent of any particular mobile phone. The SIM card allows the subscriber to change cellular telephones without having to completely re-program the new telephone. The SIM card carries all the subscriber-specification information needed by a mobile telephone or by a hybrid mobile telephone/PDA. A microprocessor and a memory package enable the SIM card to store information. The information typically consists of subscriber identity, recent location, messages received and sent, service profile, the user's phonebook, and the like. The information is initially entered to the SIM card by the service provider, which programs the SIM card with a subscriber identity and profile so that only the subscriber can access and use the SIM card. Afterward, the subscriber may enter his or her personal information such as his or her phonebook or calendar to be stored on the SIM card.

However, because of memory limitations, information such as call records, pictures, games and game records, downloaded ring tones, and such are typically stored directly on the cellular phone. This storage method typically prevents the user from transferring his or her complete set of desired information into a different cellular telephone. Additionally, when a subscriber loses his or her cellular phone, the SIM card is also lost. Even though the cellular telephone number can be readily transferred into a new SIM card, all the other information stored on the SIM card and on the cellular telephone is lost and needs to be re-entered.

Very basic solutions for data storage came with the introduction of a SIM saver, a small portable device capable of storing a copy of SIM card data by inserting the SIM card into the device and backing it up. Another solution uses a Bluetooth or infrared link device capable of uploading both phone data and SIM card data from a mobile telephone onto a computing device. Although useful, both solutions require additional devices and lengthy data transfer processes given that the data is transferred in bulk.

Over-the-air data transfer offers a better solution for mobile telephone data storage since the process can be made simple and reasonably rapid. Currently, various mobile telephone service providers along with other companies offer an on-line phonebook. The user can access the phonebook through the Internet; the phonebook can be modified and retrieved to the mobile device by means of electronic mail or SMS. For example, Verizon Wireless offers a Backup Assistant service which allows a subscriber to store an address book to a secure web site so that the contact information is readily available in case of the acquisition of a new telephone. The multiple addresses and telephone numbers can be imported to the Backup Assistant website and transferred back to the telephone with ease.

A more versatile phonebook data transfer system is capable of updating the changes made on the remote database or the mobile device phonebooks. This updating is achieved by cross-checking the changes and displaying them on both the remote database and the mobile device phonebooks. At the Las Vegas Consumer Electronics Show, Jan. 6-Jan. 9, 2005, Motorola displayed a system they term "MYBACKUP." MYBACKUP is highly similar to Backup Assistant in that the method copies one's phonebook from a Motorola GSM telephone and stores it on a secure remote server. The presenter stated that Motorola also plans to provide the same service for backing up one's games and pictures. Although systems such as these assist the subscriber, the subscriber needs to follow a time-consuming process to accomplish the task. Moreover, such systems do not allow for the automatic storage of additional desired information, and they do not back up new entries until the user focuses on and actively implements the backup method.

Other systems are available which allow various types of data to be backed up using user-friendly software which is installed on the mobile device. Attix[5] offers a product called Backup Professional-Mobile Edition (ME) which stores SIM and device data from communication devices such as cellular telephones and PDAs on its remote server. The Attix[5] software, once installed, adapts to the particular telephone and uploads a "Backup ME" category or an icon to the preset mobile device menu. The user can select the type of information that will be backed up, such as contacts, calendar, tasks, notes, and photographs. The Software compresses and encrypts that data on the communication device, and the user commands that it be backed up. Subsequent backups involve only newly stored information. The user can select the frequency of backup, or else the system can be automated such that the phone can be set to backup automatically or the network can initiate backups. Although the Attix[5] system comprises an improvement over previously described backup systems, the system is merely a backup assistant where the phone is the prior source of information and the database serves as information copy. As such, the system requires two copies of data and does not solve memory constrictions on the mobile phone.

What is needed is a system that provides remote mobile data which can be used by the user's communication device to perform typical tasks. Moreover, the system should enable the user to seamlessly use any communication device at any time. Only in this way can the user completely solve the problems related to loss of the communication device, damage to the device, robbery of the device, upgrading to another device, in addition to memory constrictions.

SUMMARY OF THE INVENTION

One object of the invention is to provide a system in which the communication device is independent of subscriber data.

Another object of the invention is to enable the subscriber to use any available communication device with all personal settings virtually immediately available.

Another object of the invention is to utilize the communication device provider database, the service provider database, a general system database, or a link to the user's personal remote database to store all of the information associated with the communication device subscriber.

Another object of the invention is to make immediately available at least one data packet comprising subscriber information via any wireless data link or network. Such data packets can include all of the subscriber-specification information required to set up the communication device plus the subscriber's personalized information. Generally speaking, the remote database would have all the information stored currently on a communication device.

Another object of the invention is the establishment of means of identification for enabling the mobile device to readily identify a user or subscriber to the service. The identification means has to be unique to an individual such as a password and/or any biometric system that is integrated into the mobile device.

Another object of the invention is to provide a seamless data transfer capabilities. That is, when the user provides an identification parameter, the processes of identification and data transfer are carried out automatically and seamlessly, such that the user experiences virtually no difference in usage between the present invention and the standard communication device, in which the subscriber data are stored on the communication device itself.

Another object of the invention is to enable the remote storage of the content of every communication, including visual and auditory information, as obtained from a device that transmits and receives audio and/or audiovisual messages.

In one embodiment, the communication device is initially set up to upload subscriber-specification information and linked to the user's personalized information on the remote database; that is, no personalized information resides on the memory of the communication device. As the user uses and makes changes to personalized information, the changes are updated and saved in the remote database. Moreover, as phone calls and other messages come in or go out, the call records are automatically transferred to the remote database.

In another embodiment, the communication device initially is set up to upload on its memory the subscriber-specification information and user's personalized information in a single data packet from the remote database. As the user makes changes to personalized information on the communication device, the remote database is updated accordingly. Moreover, as phone calls and other messages come in or go out, the call records are saved on the communication device and automatically transferred to the database.

In accordance with another embodiment, at least one portion of the personalized information stored in the remote database is made available to the subscriber upon inquiry or request. That is, when the user accesses his or her phonebook, the phonebook data is streamed from the remote database, saving memory space on the user's communication device.

In another embodiment, the user enters at least one identification parameter into his or her communication device. The communication device transfers the identification parameter to the remote database to identify the user. When the user is identified, the corresponding subscriber-specification information and the personalized information are uploaded to the communication device. As the user makes changes to the personalized information, the changes are stored both on the communication device and the remote database.

In a related embodiment, no subscriber-specification information or personalized information are needed to be stored on the communication device. User A can enter an identification parameter which is send to the database to be identified. The communication devices accesses or temporary uploads subscriber-specification information and links to personalized information stored at a remote database. The link enables User A to use the communication device with User A's personalized settings and automatically arranging, if appropriate, for billing to User A's account. When the communication device is indicated that its usage is ended, its temporary memory is cleared. The communication device may then be used by User B, who enters his own identification parameter to access or temporarily upload his own subscriber-specification information and linked to personalized settings at a remote database. User B's link enables User B to use the communication device with User B's personalized settings and automatically arranging, if appropriate, for billing to User B's account.

BRIEF DESCRIPTION OF THE DRAWINGS

A further understanding of the present invention can be obtained by reference to preferred embodiments set forth in the illustrations of the accompanying drawings. Although the illustrated embodiments are merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION OF THE DRAWINGS

Detailed illustrative embodiments of the present invention are disclosed herein. However, techniques, systems and operating structures in accordance with the present invention may be embodied in a wide variety of forms and modes, some of which may be quite different form those in the disclosed embodiments. Consequently, the specific structural and functional details disclosed herein are merely representative, yet in that regard, they are deemed to afford the best embodiments for purposes of disclosure and to provide a basis for the claims herein that define the scope of the present invention. The following presents a detailed description of preferred embodiments of the present invention.

Figure 1:
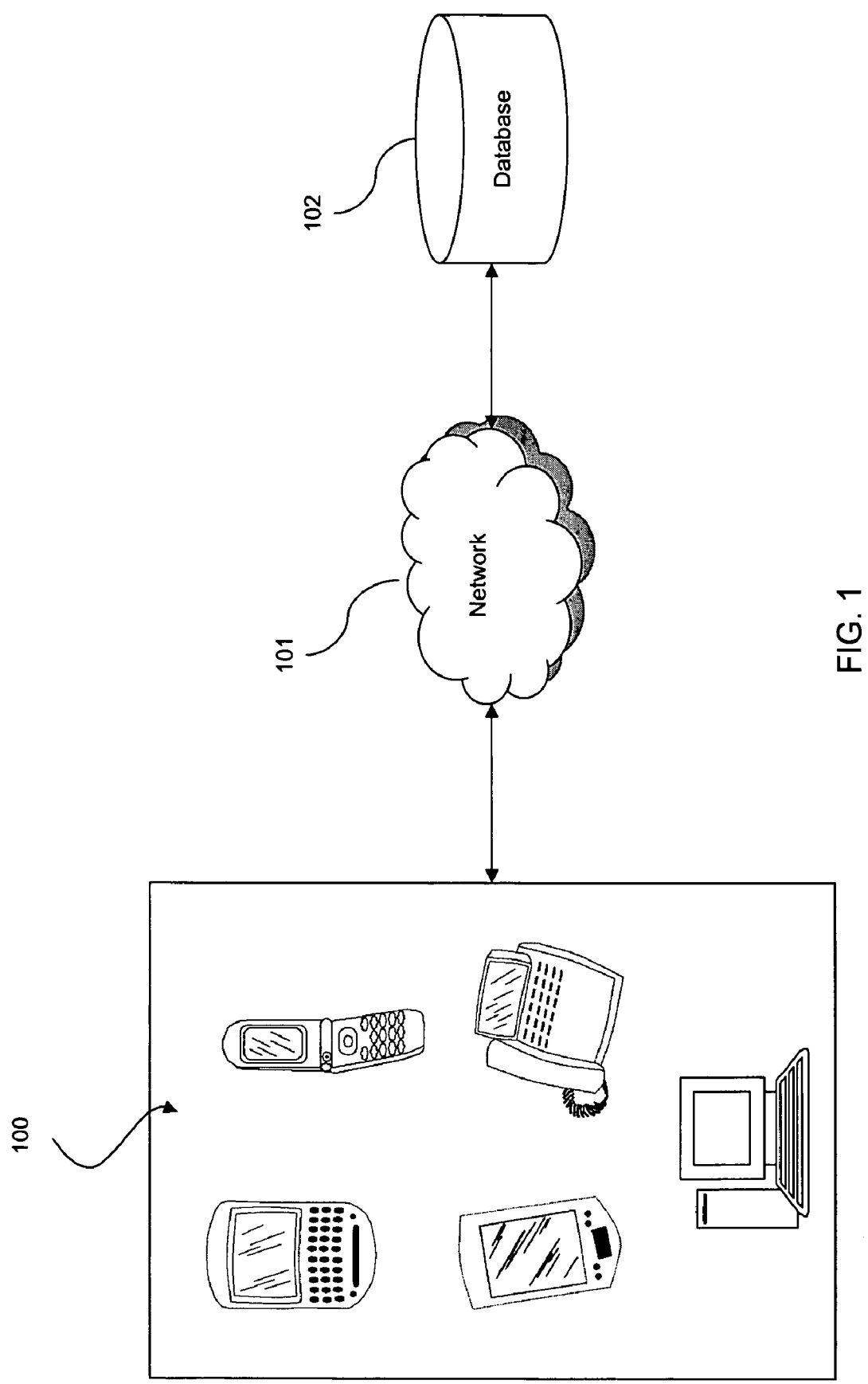
FIG. 1 depicts an illustration of the interaction of the major components of communication devices, network, and database, in accordance with the present invention.

The present invention comprises a system in which communication device (hereinafter "CMD") 100 can access and retrieve mobile information from remote database (hereinafter "DB") 102 via network 101, as seen in FIG. 1. The CMD 100 could be chosen from a group consisting of, but not limited to a hand-held device, cellular telephone, hybrid cellular telephone/PDA device, PDA, personal computer, laptop computer, pocket computer, hybrid electronic device, or the like. The network 101 could be of any type, including but not limited to a network that is wired, wireless, GSM, CDMA, ISDN, Ethernet, CATV, Wi-Fi, LAN, Bluetooth, or the like. A wireless transmitting station (not shown) could be used to connect wireless CMDs to the network 101, as a base station in a GSM network.

Since the mobile information resides on remote DB 102, the system provides a stable and secure source of information that is accessible from various CMDs and various kinds of CMDs. The mobile information is all the information associated with a communication service subscriber and could consist of, but is not limited to subscriber-specification information (hereinafter "SSI") and personalized information (hereinafter "PRI). The SSI is necessary for the CMD to arrange phone communications since it stores a personal identification number of the subscriber, which identifies the subscriber to the network to which the subscriber belongs. The PRI could consist of settings and downloaded contents by the subscription service or by the user such as, but not limited to, subscriber identity, recent location data, music contents (ringtones, sound settings), picture contents, video contents, messages (SMS, picture, text, voice, etc.), call records (missed calls, incoming/outgoing, etc.), games and game records, and the like. The information could be accessed by CMD 100 without physically storing the information on the CMD 100 but simply scrolling through the information stored on remote DB 102. Information can be edited, deleted, and added onto DB 102 through the CMD 100 essentially using the CMD 100 as an interface between the user and the information.

CMD 100 needed to be downloaded with software capable of implementing such system. The software is made to connect to DB 102 and have capabilities to scroll such DB 102. It is important for the software to provide a user with a virtually seamless data streaming, as if the information were stored on CMD 100, while the information is actually stored on remote DB 102. Also, the provided software should be capable of converting the personalized data and setting stored on the DB 102 to the appropriate format supported by the CMD 100, such that data can be correctly displayed. The software could be downloaded by the user, such as accessing a website through CMD 100 and choosing a download function. Alternatively, CMD 100 could be preset with such software from either the manufacturer or the service provider.

Given current typical service arrangements, it may be most likely that remote DB 102 will be operated by the service provider. The service provider could use such information to keep calling records which could be used for billing. It is also possible that the database could belong to and/or be operated by the provider of CMD 100, the user of CMD 100, or another party. When it is desirable for the DB 102 to support more than one user, the operator of the DB 102 can index the stored information according to an appropriate user identifier, for instance an SSI, phone number, serial number, PIN, image, biometric identifier, or the like, such that only an authorized user can access the SSI and/or PRI stored on remote DB 102.

Figure 2A:
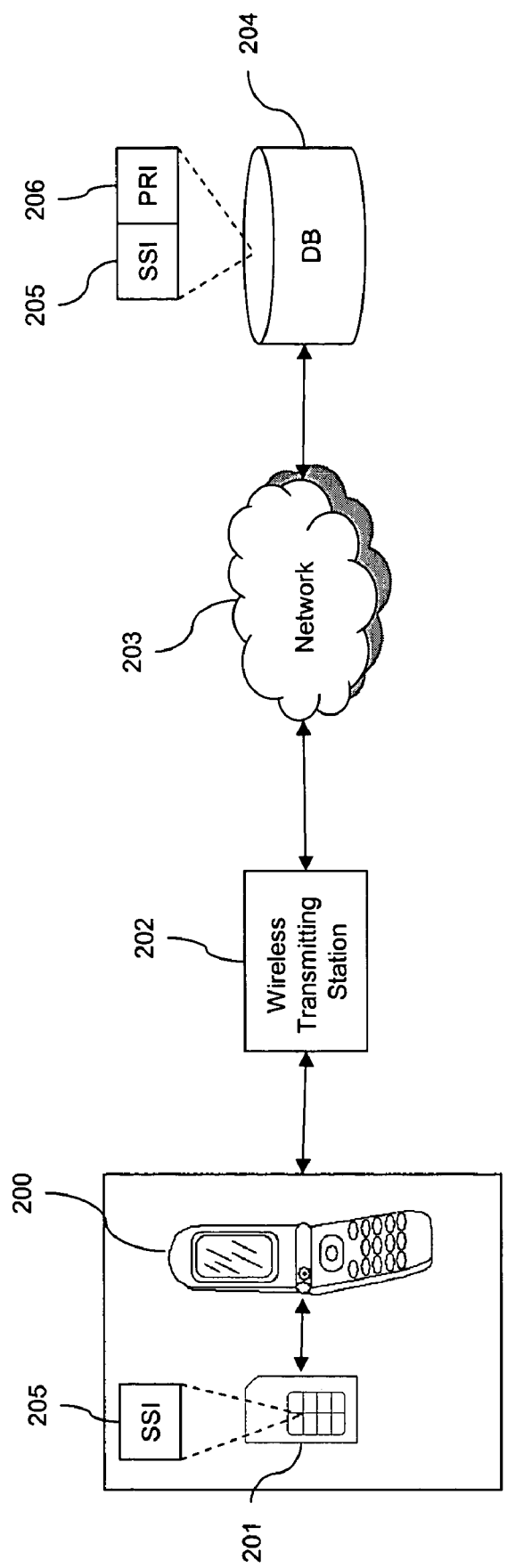
FIG. 2A depicts a system wherein the communication device is preset with subscriber-specification information and a link to personalized information on a remote database, in accordance with the present invention.

In a common implementation of FIG. 2A, the CMD 200, in this case a cellular telephone, or a remote memory associated with CMD 200, such as a smartcard 201, could initially be loaded with SSI 205 and the system software as one way of enabling an entirely automated system. The software could enable CMD 200 automatically link to DB 204 and its respective mobile contents, such as PRI 206, through wireless transmitting station (hereinafter "WTS") 202 and network 203. In such an implementation, no other PRI 206 needs to be residing on CMD's 200 internal memory or smartcard 201. The PRI 206 on remote DB 204 can be indexed such that as CMD 200 makes inquiries about information, the DB 204 is directed to the appropriate category of information. For example, if the user desires to use phonebook contents, and indicates same by some action such as pressing a key for "Phonebook" or issuing the voice command "Phonebook," CMD 200 is directed to access phonebook contents associated with that user and resigning on remote DB 204.

Figure 2B:
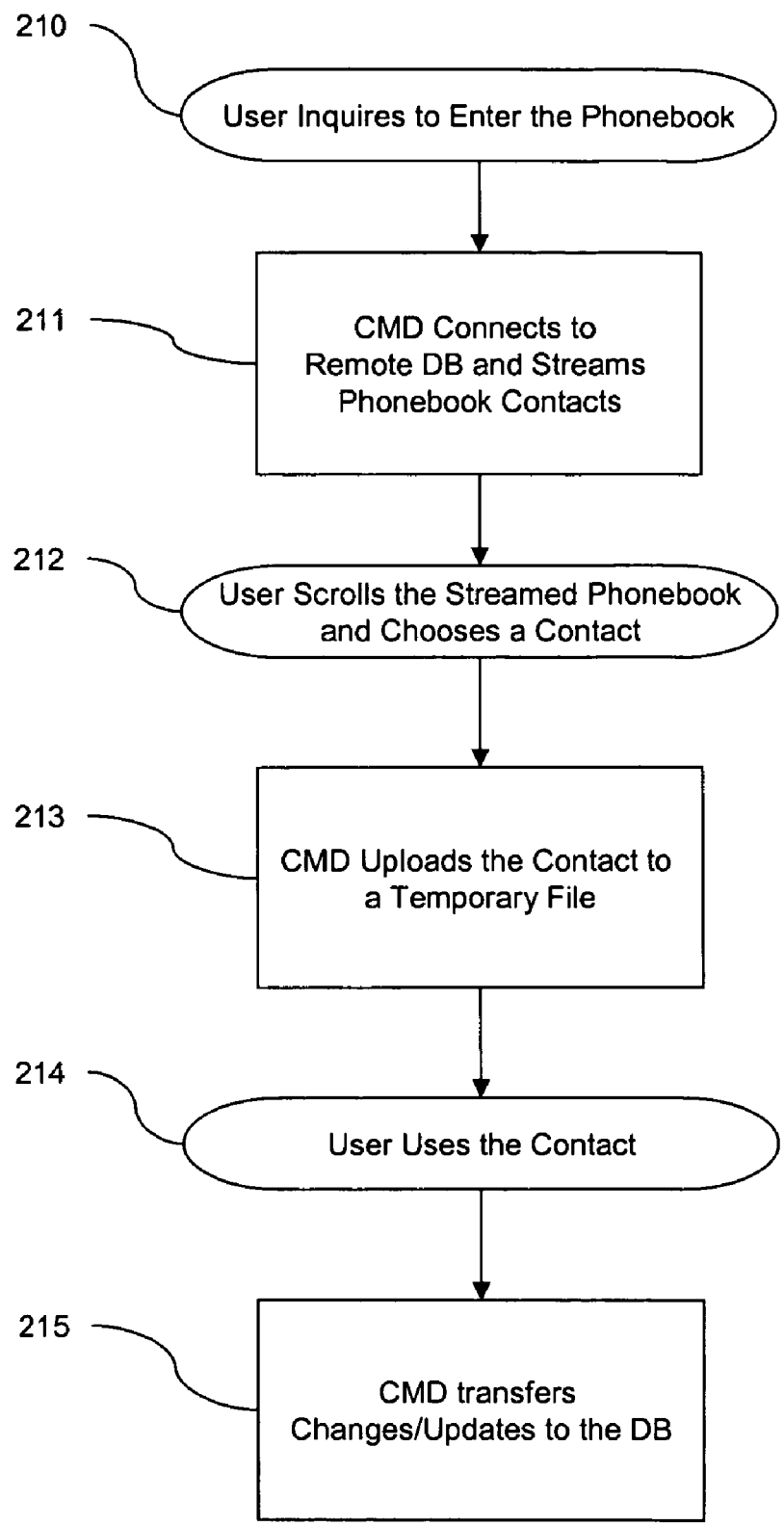
FIG. 2B depicts a flow diagram of user interaction with the system of FIG. 2A, in accordance with the present invention.

For example, it can be seen from FIG. 2B how a user uses CMD 200 to access a phonebook on remote DB 204. As the user makes a selection on the CMD menu to access phonebook information as in process 210, the CMD 200 automatically connects to relevant phonebook information associated with the PRI 206 on the remote DB 204. The user can then use the CMD 200 to scroll through his or her phonebook contents in process 211. The stream phonebook contents are then displayed on the CMD 200. The user can then use CMD 200 to scroll through his or her phonebook contents on remote DB 204 as shown in process 212. The user can then use the contents of the phonebook to accomplish various tasks, such as making contact with the individual or group listed in the phonebook, as well as editing, deleting, or adding contact information. If the user chooses to contact an individual or group listed in the phonebook in process 212, he or she can issue an appropriate command causing the contact information to be uploaded to a temporary file on the CMD's 200 internal memory or the smartcard 201 in process 213 and use it to dial in process 214. The new call records such as the number dialed, the time, and the duration of the call can be transferred to the DB 204 in process 215. If the user wishes to edit contact information, the display of the chosen contact can be uploaded to CMD 200 in process 213, where the user makes the changes in process 214 which are transferred back to remote DB 204 for storage in process 215. When the user finishes using the phonebook and all appropriate updates have been transferred to DB 204, all the information uploaded to the temporary files could be cleared unless otherwise specified by the user.

Other PRI 206 can be accesses and modified in a similar manner. The user may wish to keep all ring tones stored on remote DB 204; however, as he or she sets CMD 200 to use one of the tones, it may be uploaded to the CMD 200. As the user changes the sound settings of CMD 200, it might clear the previous tone from its memory and replace it with the new one. Instead, the ring tones could be strictly saved on the DB 200. As a call is coming, in the switching network could determine to stream the ring tone to the CMD 200, save it on a temporary file, and play it on the CMD 200; when the user answers the call, the ring tone can be cleared from the memory.

Figure 3:
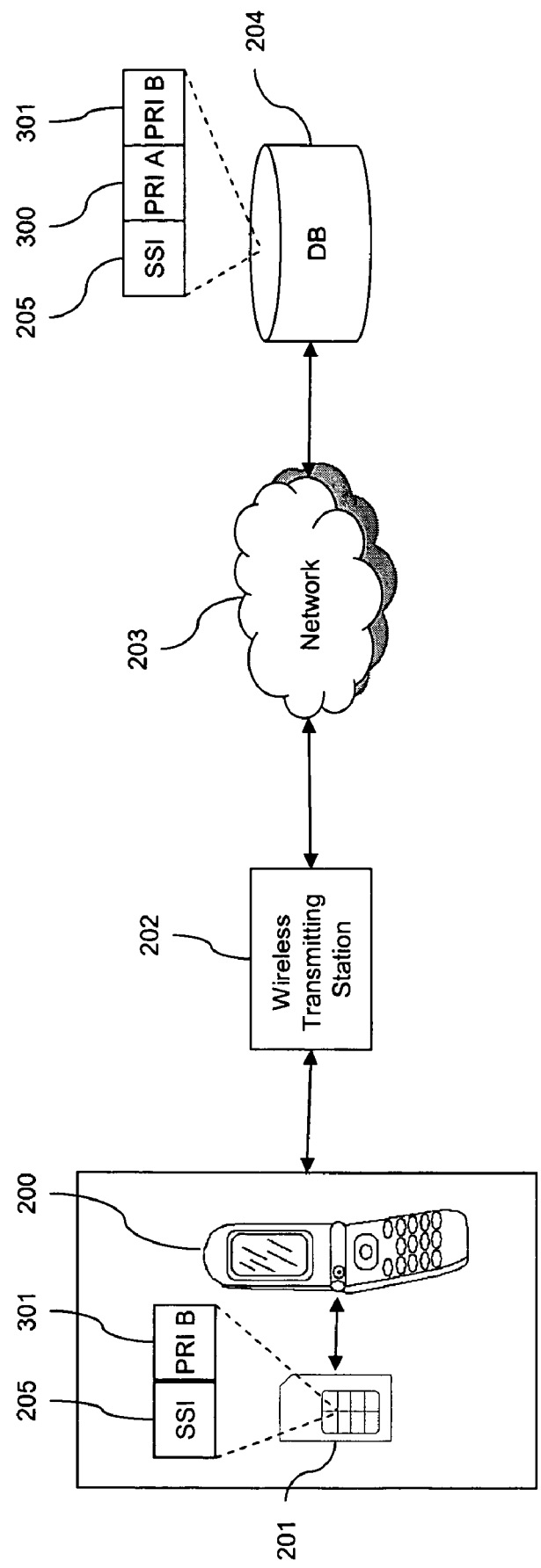
FIG. 3 depicts a system wherein the communication device uploads a portion of personalized information, wherein changes to the portion of personalized information are transmitted to update the remote database, in accordance with the present invention.

Even though all information (e.g. PRI A 300, PRI B 301, and SSI 205) resides on remote DB 204, a portion of information, such as PRI B 301 could be saved on at least one memory means in CMD 200 as shown in FIG. 3. The service provider or the user could have the choice to save any desired information on the CMD 200. Since the phonebook and the calendar are often used, the user might wish to upload their entire contents, for example PRI B 301 to CMD 200. Other PRI information could be uploaded to the CMD 200 as needed by the system or as required by the user. However, for purposes of backup, security, and/or frugal use of memory space in CMD 200, the present invention enables the simultaneous and automatic transfer and storage of such information to remote DB 204.

Figure 4A:
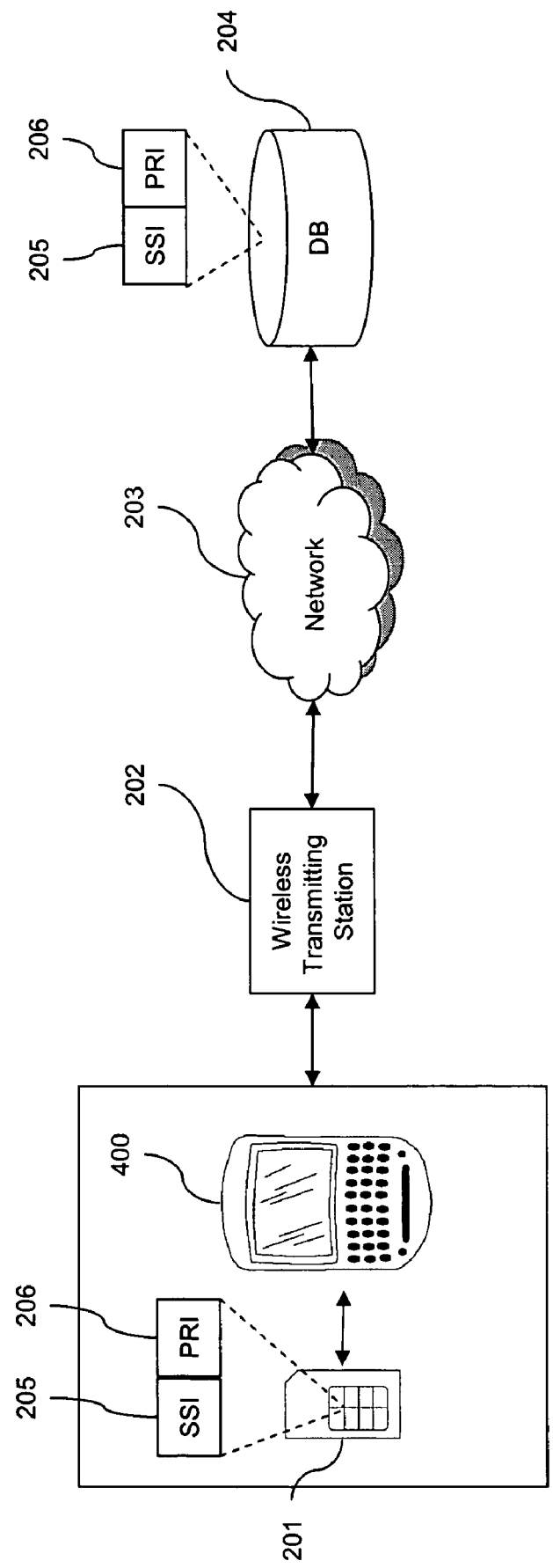
FIG. 4A depicts a system wherein the communication device uploads all mobile information, wherein changes to the mobile information are transmitted to update the remote database, in accordance with the present invention.
Figure 4B:
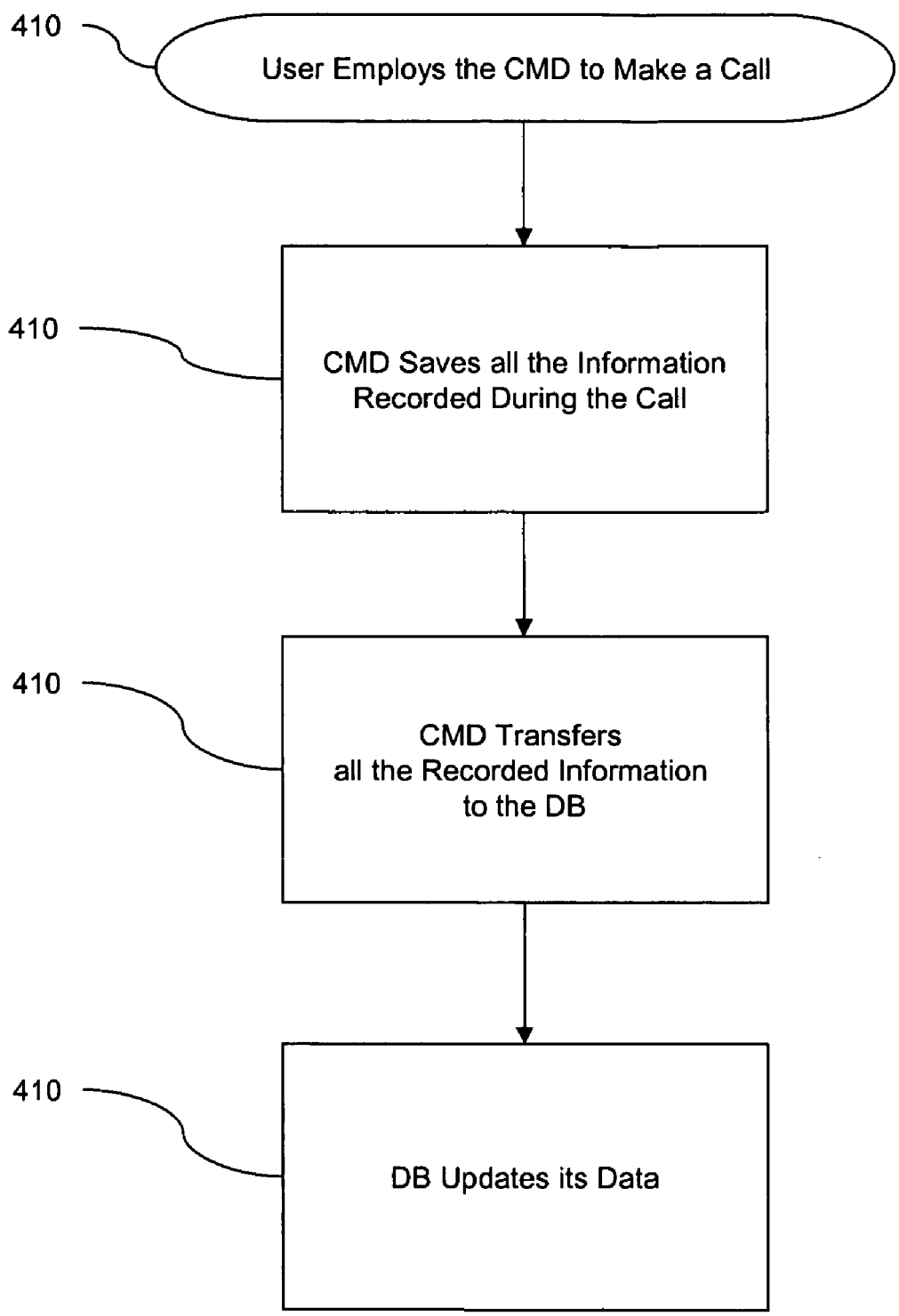
FIG. 4B depicts a flow diagram of user interaction with the system of FIG. 4A, in accordance with the present invention.

It is also possible for the system to be implemented such that all the information (e.g. SSI 205 and PRI 206) on remote DB 204 is uploaded to CMD 400, in this case a hybrid device, in single data packet, as shown in FIG. 4A. As initial setup, a data packet containing SSI 205, PRI 206, and system software could be streamed by the user or by the service provider to the CMD 400 through WTS 202 and network 203. Since the data packet could contain large amount of data, which might take some time to transfer, the data may be encrypted before the transfer. However, it is still desired that any changes or additions made on CMD 400 are transferred to DB 204 to update the information associated with the user on the remote server. For example, as in FIG. 4B, if the user makes a call from CMD 400 as in process 410, it can save the call record, including number dialed, the time, and the duration of the call, in the phone log in process 411. CMD 400 can also record the conversation and such recorded data can be transferred in process 412 along with additional data to remote DB 204 for storage as in process 413.

Figure 5A:
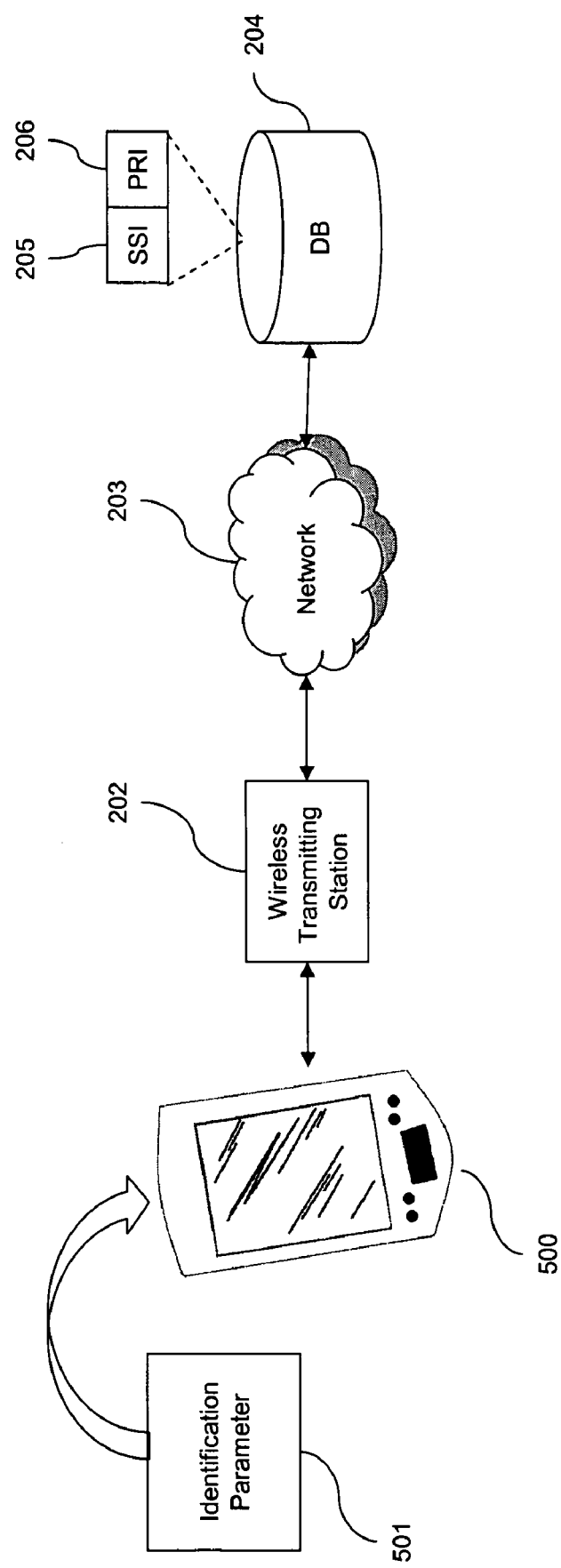
FIG. 5A depicts a system wherein the user presents an identification parameter to the communication device to access mobile information on the remote database, in accordance with the present invention.
Figure 5B:
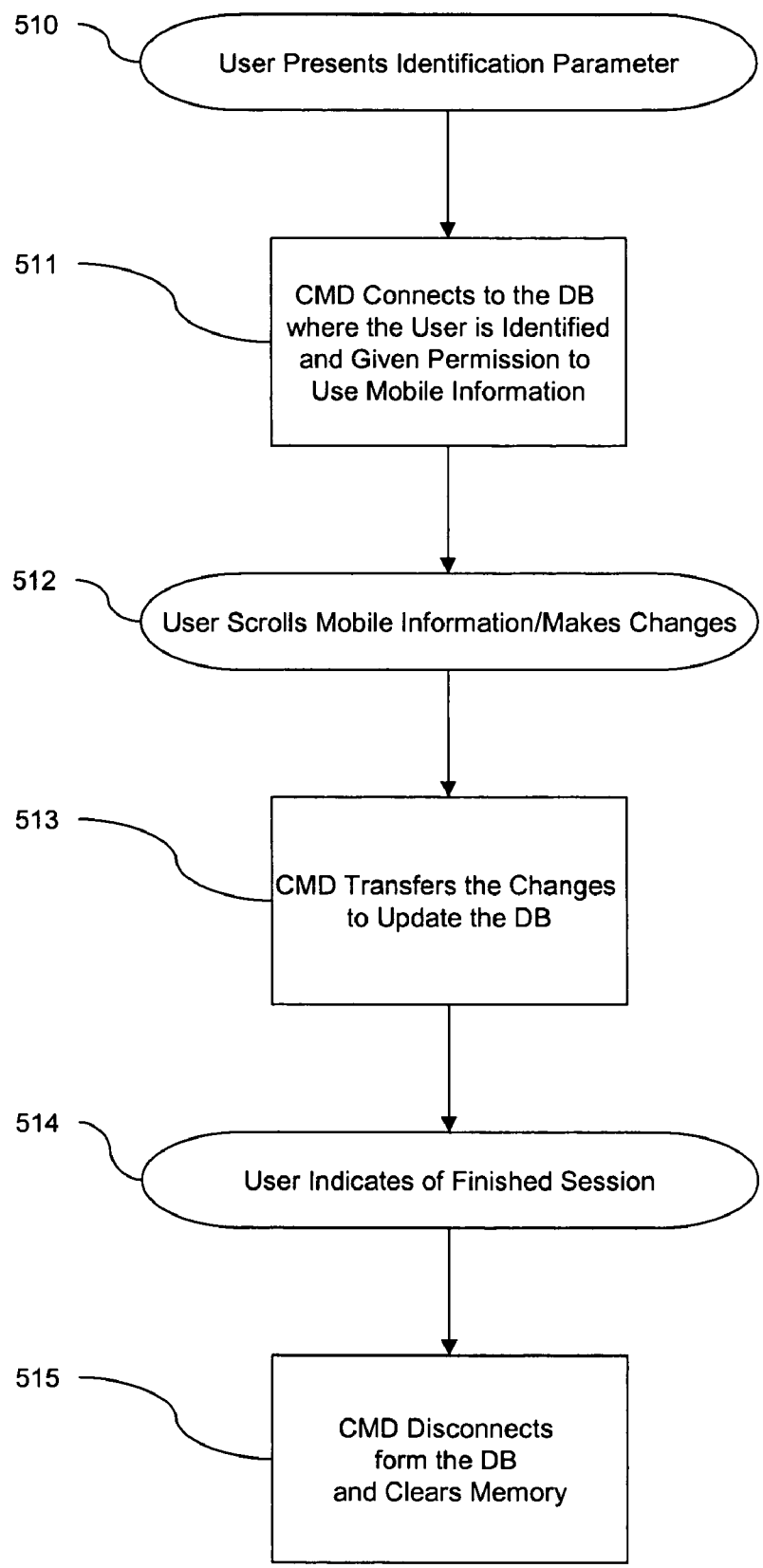
FIG. 5B depicts a flow diagram of user interaction with the system of FIG. 5A, in accordance with the present invention.

In a preferred embodiment, as shown in FIG. 5A, the system could comprise CMD 500, for example a PDA/phone, that is "independent" of the user; that is, no SSI 205 is stored on CMD 500. The user can then use any available device equipped with system software and access SSI 205 and/or PRI 206 stored on remote DB 204 through WTS 202 and network 203. The SSI 205 and/or PRI 206 stored on DB 204 can be protected by an identification parameter 501 (hereinafter "IDP"). In use, referring to FIG. 5B, the user can enter IDP 501 into the CMD 500 in process 510; the CMD 500 could transfer IDP 501 to remote DB 204, wherein processing means compare IDP 501 to parameters stored in DB 204, and identify the user by finding a match as shown in process 511. The user's SSI 205 can then be transferred to CMD's temporary file so that the user can use CMD 500 as his/her own device and can be billed for the used services. The user can then use all the PRI 206 available on DB 204, use CMD 500 to add information, edit information, and delete information in process 512, and simultaneously be updating his or her information stored in remote DB 204 in process 513.

It is desirable that as a user finishes using the CMD 500 in process 514, it could clear its memory functions of all or a portion of the information associated with the user as desired, as shown in process 515. However, some information, such as the SSI 205, could remain stored on CMD 500 if the user uses CMD 500 frequently or chooses to do so. Various indicators could terminate the session by CMD 500 and/or the processing means at remote DB 204 as hanging up, pressing an END key, closing the top of a flip phone, issuing a vocal command, or the like.

Figure 5C:
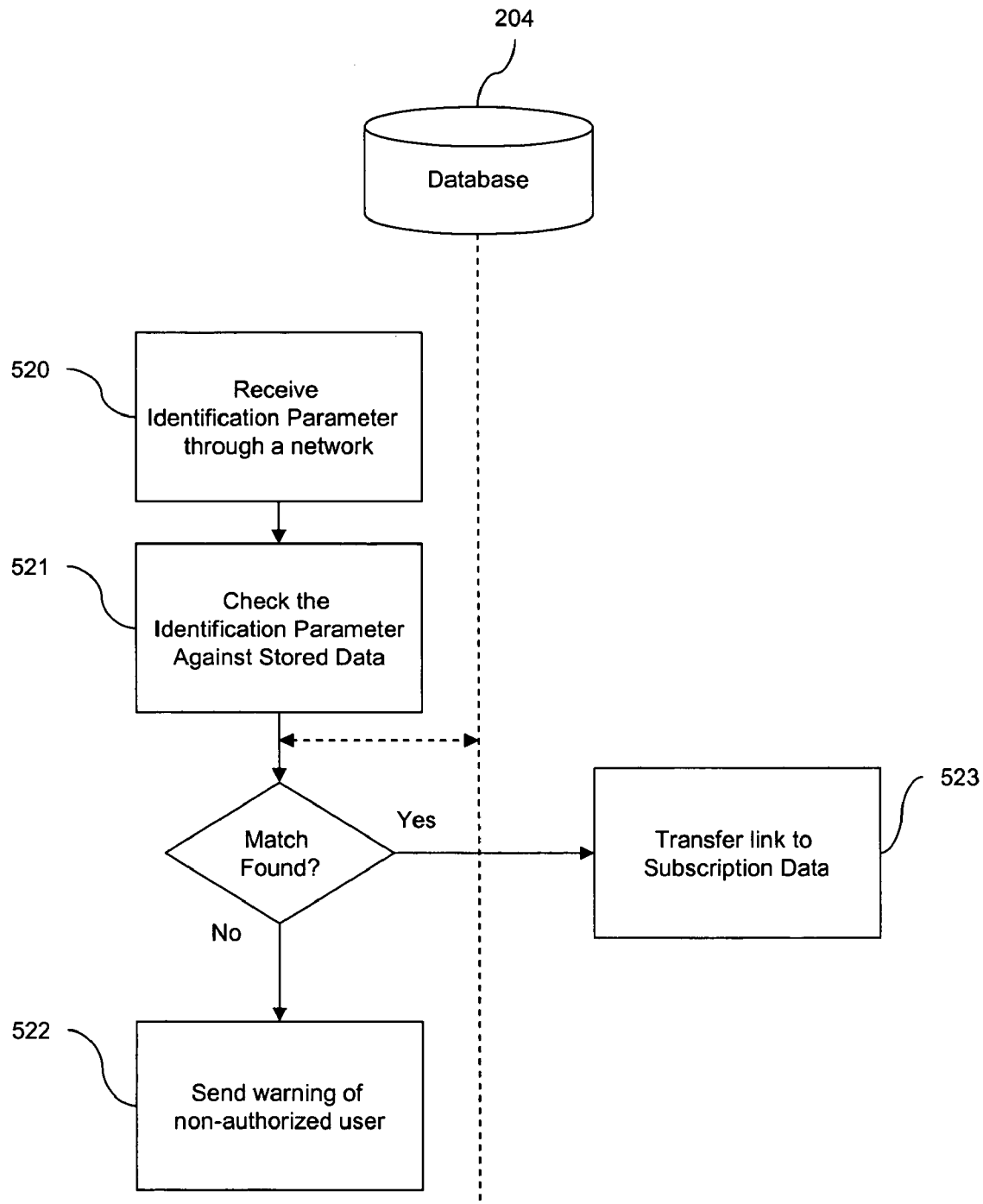
FIG. 5C depicts a block diagram of the steps for identifying the user as an identification parameter is received at the database, in accordance with the present invention.
Figure 6A:
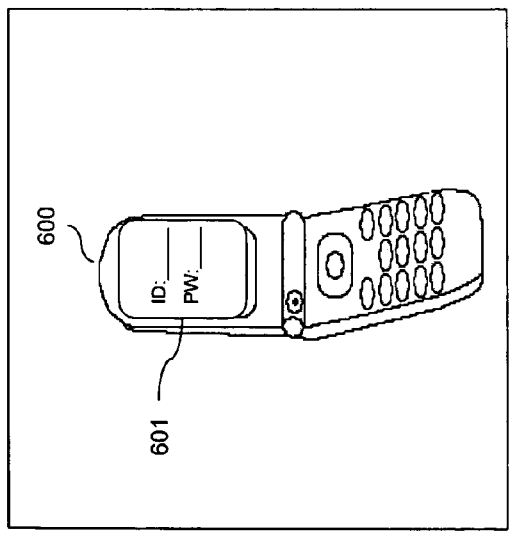
FIGS. 6A-6D depict the implementation of various identification parameters into the communication device such as username/password and biometric identifiers, in accordance with the present invention.
Figure 6B:
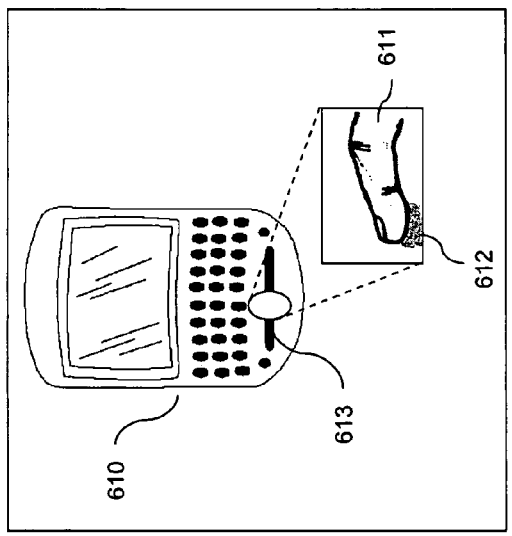
Figure 6C:
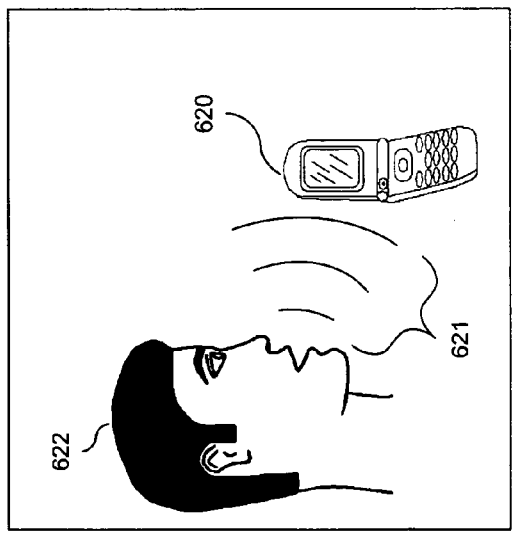
Figure 6D:
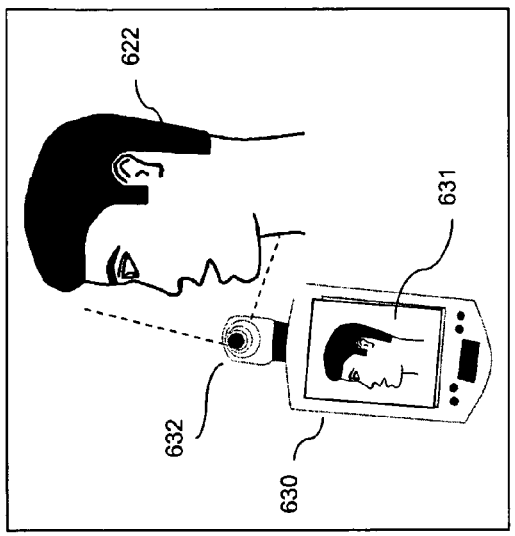

Further, the DB 204 could keep the subscriber's information indexed according to IDP 501. As seen in block diagram in FIG. 5C, as newly-captured IDP 501 is received by DB 204 in block 520, the processing means associated with DB 204 could compare it against identification data stored in DB 204 in block 521. If a match is found, DB 204 can transfer a link to the SSI 205 and/or PRI 206 to CMD 500, or DB 204 could upload CMD 500 with the SSI 205 and/or PRI 206 as shown in block 523. However, if IDP 500 does not match any identification data stored in DB 204, the user is not recognized cannot use the CMD 400. A warning of non-authorized user can be sent to the CMD 500 as in block 522. Alternatively, it could be the case that anyone who attempts to use CMD 500 can call "911" or similar emergency "numbers." In such cases, if IDP 501 is identified, the CMD 500 could transmit whatever information it has about the user to the emergency functionality and to remote DB 204, including biometric information, positioning information, the content of the call, the serial number of CMD 500, the identifying information of the party to whom CMD 500 is registered, and the like.

Different configurations could be implemented in implementing the IDP capture by the CMDs as shown in FIGS. 6A-6D. The various IDPs used could be, but not limited to a username/password 601, biometric identifier 612, 621 and 631, or the like. In username/password IDP implementation of the CMD 600, in this case a cellular phone, user could be prompted to enter subscriber username or some sort of alphanumeric ID and further verify it with a password or an electronic signature. The system could then verify the username and password 601 against usernames and passwords stored on the DB.

Alternatively, a variety of biometric systems could be implemented using the CMDs such as, but not limited to, DNA pattern recognition, body geometry feature recognition (ear, hand, finger, etc.), skin recognition (fingerprints, palmprints, etc.), facial recognition, optical recognition (retinal scan, iris scan, etc.), voice recognition, signature recognition, keystroke recognition, vascular pattern recognition, infrared identification (face, hand, hand vein, etc.), or the like. Also, such identification can be "invisible" or apparent to the user. Assume that CMD 610, in this case a hybrid device, is fitted with fingerprint scanner 613 capable of obtaining fingerprint sample 612 from the user. If the system is invisible, it could be that any key on CMD 610, preferably one which has to be pressed in order to use the device, can register fingerprint 612. In such case, the user presses the key without knowledge that his or her fingerprint is being scanned. The database receives the fingerprint and the user can then use the device. If the system is apparent to the user, the user may be instructed to take a picture of finger 611 with a camera of a camera-enabled device. It could also be that the process is made apparent to the user by connecting a dedicated fingerprint scanner to CMD 610.

Given that a function of CMD 620, in this case a cell phone, is to transmit audio information, it would also be appropriate to integrate voice recognition into the identification process. Voiceprint 621 could be captured automatically when user 622 speaks into CMD 620, rendering the identification process invisible to user 622. The voice recognition system could also require user 622 to speak into CMD 620 to capture voiceprint index 621 as a way of providing identifying information such as his or her name or a password. In such a case, user's voiceprint 621 could also be analyzed by the processing means of the remote DB. It could be that voiceprint 621 is the only datum that is actually required to identify user 622, or else it could be that voiceprint 621 is another means, along with, say, a password or PIN, of verifying the identity of user 622. If voiceprint 622 is a secondary means of identification, the parameters for recognition of voiceprint 622 could be set more widely.

The recognition means of CMD 630, in this case a camera enabled PDA/Phone, could be of a face recognition system. Camera 632 attached or removably attached to CMD 630, could capture image 631 of user 622. Image 631 could be transmitted to the DB where they are compared with stored images of the users and matched to an appropriate user.

Such system is implemented with an ease if there is one DB associated with all possible subscribers since the user can offer an IDP and directly connect to the DB. Alternatively, there could be a database used which only functions to identify various users. The database can store SSI with a link to the information DB and the user's corresponding identification data. When a user enters identification data to the CMD, the data is sent to the database where the user is identified and the SSI and linking information is uploaded to the CMD. The user can then enter the DB to use his or her corresponding information.

However, when each subscriber maintains a personal DB, there needs to be a means for the user to specify the subscriber upon use. With a username/password protected CMD, the user might have to enter characters with the username which indicate the associated subscriber. For example the username could be "username@subscriber" or the user's phone number which could enable the CMD to associate the username with the correct DB. However, when biometric recognition is used, the system could either search through all the available DB's or require the user to specify the subscriber before entering the biometric data. Alternatively, each CMD could be registered to a particular subscriber such that user can only use phones associated with the service they subscribe. In such a way, when a user inputs an IDP only the DB associated with the phone's subscriber is searched.

Figure 7A:
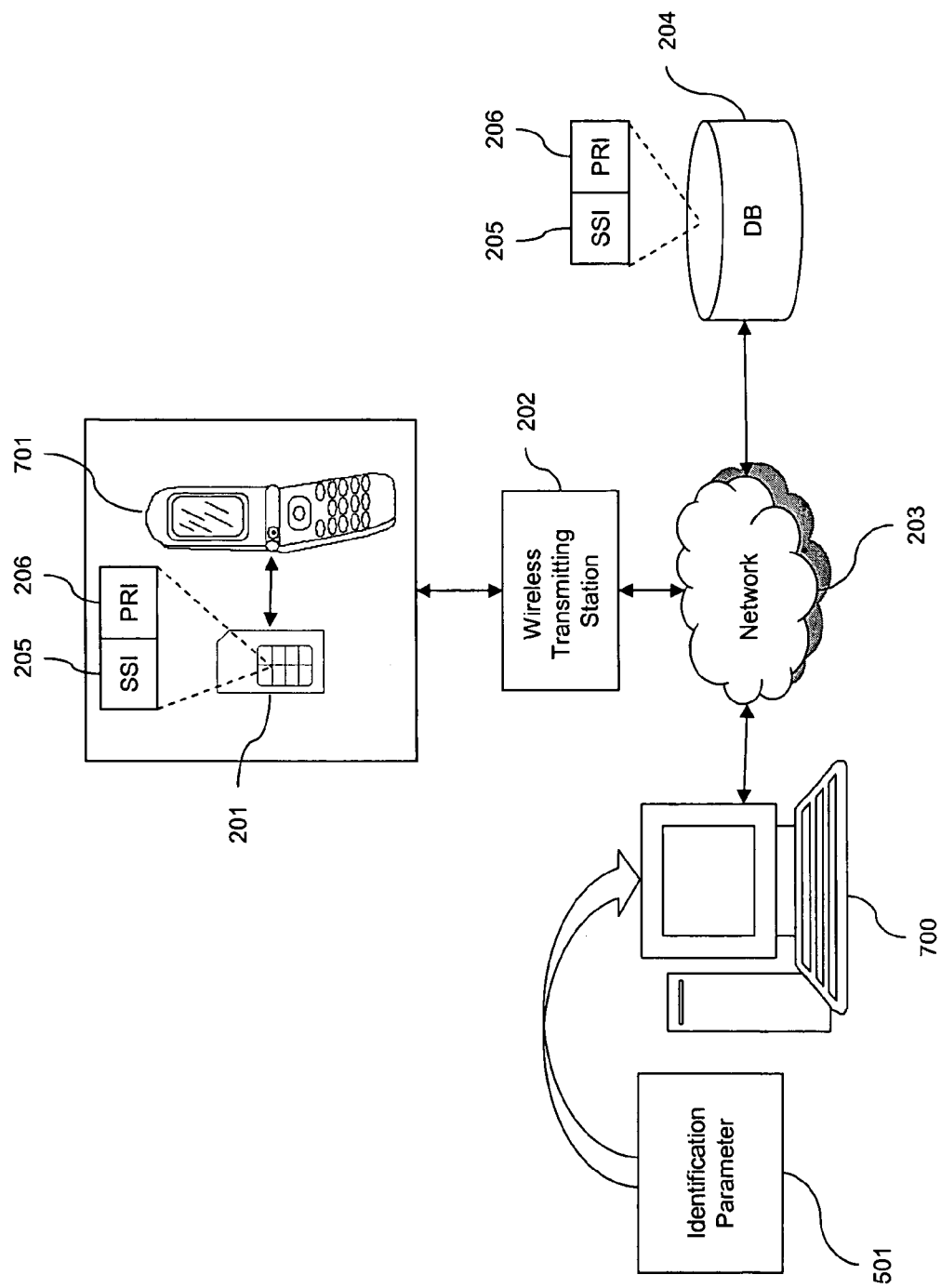
FIG. 7A depicts a system wherein the user presents an identification parameter to a personal computer to access mobile information on the remote database, wherein changes to the mobile information are transmitted to update the communication device, in accordance with the present invention.
Figure 7B:
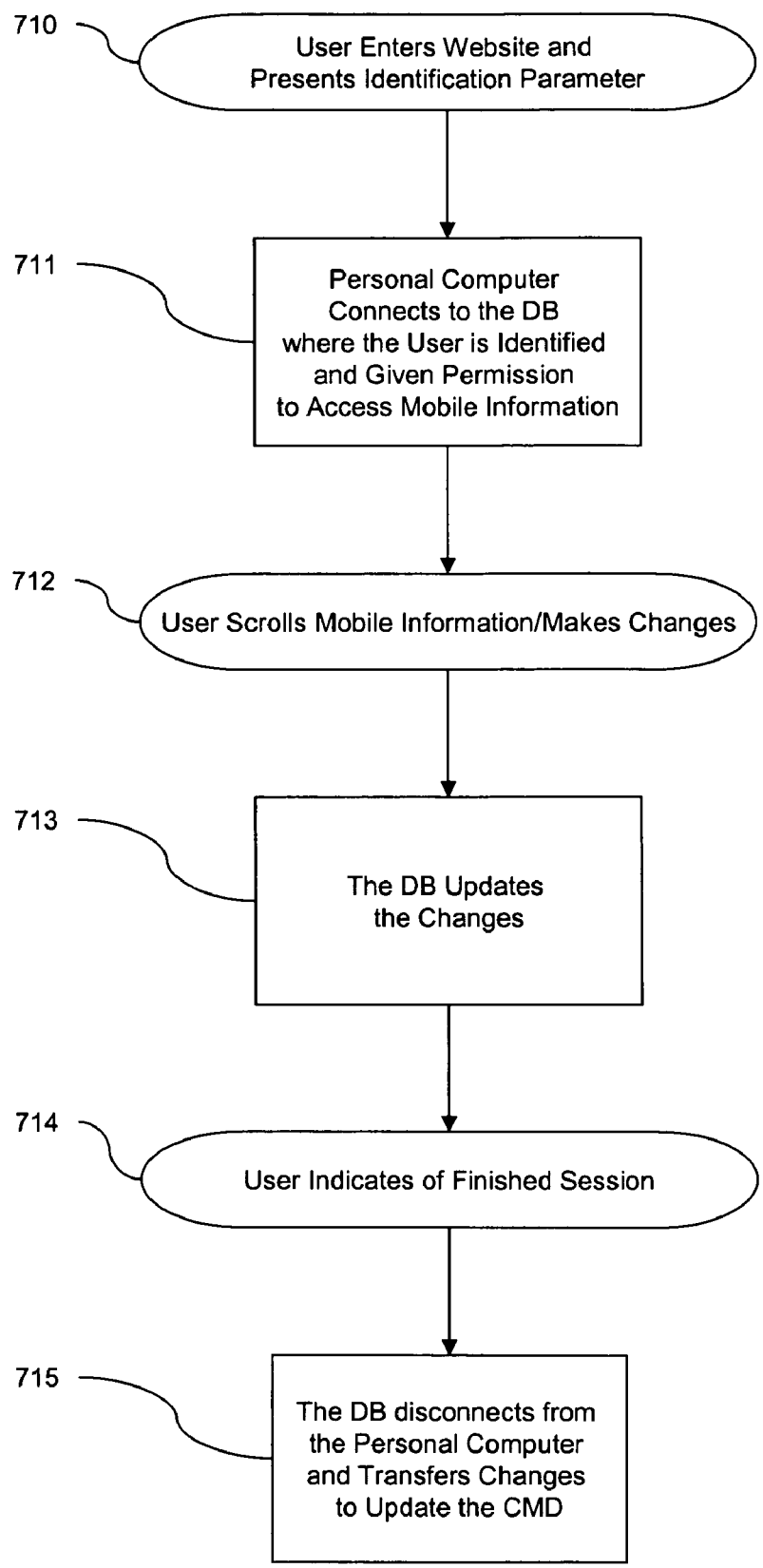
FIG. 7B depicts a flow diagram of user interaction with the system of FIG. 7A, in accordance with the present invention.

To better serve the user's needs, the system can be implemented such that the user can access and make changes to his or her mobile information (e.g. SSI 205 and 206) on a personal computer 700 as shown in FIG. 7A. If the DB 204 is operated by the user, it may be likely that the DB 204 resides on user's personal computer 700. As such, the user can access the DB 204 directly from the personal computer 700 and enter changes to the information. The personal computer 700 may have system software installed which synchronizes personal computer 700 and the CMD as well as provides easy to use data-management. However, in preferred embodiment the DB 204 is operated by the service provider. The service provider can offer a website over the Internet as a bridge between user's personal computer 700 and the DB 204 over network 203. In use, referring to FIG. 7B, the user can enter the website and login by providing an IDP 501 in process 710, such as a username and password. The personal computer 700 connects to the DB 204 over network 203 where the user is identified and is given access to his or her SSI 205 and/or PRI 206, in process 711. Using the website the user can view the mobile information and make changes, in process 712. The changes made to the SSI 205 and/or PRI 206 update the DB 204 in process 713 and the user can finish the session in process 714. Any changes made to SSI 205 are transferred to CMD 701 through network 203 and WTS 202 and saved on CMD's 701 internal memory or on the smartcard 201 in process 715. If the CMD 701 stores PRI 206 or a portion of PRI 206, the DB 204 transmits the changes to the CMD 701 updating the stored PRI 206.

What is claimed is:

1. A system for accessing information stored remotely comprising:
   a remote database for storing mobile information regarding a plurality of subscribers; and
   a communication device for facilitating communication between at least one subscriber and a third party, wherein said communication device comprises at least one memory, a display screen, a transmitter and a receiver, wherein said communication device is associated with a first subscriber;
   wherein said remote database receives authentication information from a second subscriber, wherein said authentication information is transmitted from said communication device,
   wherein said communication device receives, via a receiver, first identification information for associating said communication device with said second subscriber, and receives a plurality of second identification information regarding each type of a first mobile information regarding said second subscriber upon a positive authentication of said second subscriber,
   wherein said communication device prevents access to a second mobile information regarding said first subscriber that is stored in said at least one memory upon a positive authentication of said second subscriber,
   wherein said communication device displays via said display screen said plurality of second identification information for viewing each type of said first mobile information, and
   wherein said communication device selects at least one of said plurality of second identification information to create selected identification information,
   wherein said communication device receives, via said receiver, a subset of a plurality of said first mobile information in response to transmitting, via a transmitter, said selected identification information to said remote database, and
   wherein said communication device stores at least one item of said subset of a plurality of said first mobile information in said at least one memory for communication with a third-party associated with information contained in said at least one item,
   and wherein said communication device automatically transmits to said remote database an update to said at least one item, and
   wherein said communication device deletes said subset of a plurality of said first mobile information and deletes said first identification information from said at least one memory in response to terminating communication with each of said third-party and said remote database.

2. A system according to claim 1 wherein said communication device comprises at least one selected from the group consisting of a hand-held device, a cellular telephone, a hybrid cellular telephone, a PDA, personal computer, laptop computer, pocket computer, and hybrid electronic device.

3. A system according to claim 1 wherein each said first and said second mobile information comprises at least one selected from the group consisting of a subscriber specification information, a subscriber identity, a location data, a phone setting, a music content, a picture content, a video content, a message, a call record, and a game.

4. A system according to claim 1 wherein said communication device accesses said first mobile information over a link.

5. A system according to claim 1 wherein said communication device accesses said first mobile information across a network.

6. A system according to claim 5 wherein said network is selected from a group consisting of a wired network, a wireless network, a GSM network, a CDMA network, an ISDN network, an Ethernet network, a CATV network, a Wi-Fi network, a LAN, and a Bluetooth network.

7. A system according to claim 1 wherein said communication device is used to make changes to said first mobile information of said second subscriber onto said remote database.

8. A system according to claim 1 wherein said communication device is used to enter new data to said first mobile information onto said remote database.

9. A system according to claim 1 wherein said communication device clears its memory of unsaved said subset of a plurality of said first mobile information when the use of said communication device has ended.

10. A system according to claim 9 wherein methods of ending use of said communication device are selected from a group consisting of hanging up, pressing an END key, closing the top of a flip-top telephone, or issuing a voice command.

11. A system according to claim 1 wherein at least a portion of said first mobile information is stored on said at least one memory means associated with said communication device, and wherein changes made to said portion of said first mobile information are transmitted to said database.

12. A system according to claim 1 wherein said communication device comprises a display unit.

13. A system according to claim 12 wherein said plurality of said first and said second identification information stored on said remote database is displayed on said display screen.

14. A system according to claim 1 wherein a plurality of said first mobile information stored on said remote database is indexed such that said communication device is directed to a selected index of inquiry.

15. A system according to claim 1 wherein a portion of a plurality of said first mobile information is temporarily uploaded to said at least one memory and used by said communication device to engage in communication.

16. A system for accessing communication by a communication device, the system comprising:
   a database comprising a first mobile information associated with an identification parameter, wherein said first mobile information is associated with a first subscriber;
   a communication device comprising at least one memory means, a display means, and a means for capturing at least one kind of identification parameter, wherein said communication device is associated with a second subscriber;
   a transmitting means for transmitting said captured identification parameter to said database;
   a means for matching said captured identification parameter with said identification parameter stored on said database;
   a means for accessing said first mobile information associated with said matched identification parameter by said communication device, wherein said communication device receives via a receiver a plurality of identification information regarding identifying each type of said first mobile information, and displays via said display screen said plurality of identification information for viewing said each type of said first mobile information in said database, and selects at least one of said plurality of identification information to create selected identification information,
   wherein said database receives information for authenticating said first subscriber, wherein said authenticating information being transmitted from said communication device,
   wherein said communication device receives identification information for associating said communication device with said first subscriber, receives a subset of said first mobile information in response to authenticating said first subscriber and in response to said communication device communicating said selected identification information to said remote database with said transmitter,
   wherein said communication device prevents access to second mobile information regarding said second subscriber that is stored in said at least one memory upon said positive authentication of said first subscriber, and
   wherein said communication device retrieves at least one item of said first mobile information, and communicates with a third-party associated with information contained in said at least one item, and
   wherein said communication device transmits to said database an update to said at least one item and deletes said subset of said first mobile information from said at least one memory in response to terminating communication with said third-party and said database.

17. A system according to claim 16 wherein said communication device comprises at least one selected from the group consisting of a hand-held device, a cellular telephone, a hybrid cellular telephone, a PDA, personal computer, laptop computer, pocket computer, and hybrid electronic device.

18. A system according to claim 16 wherein said first mobile information comprises at least one selected from the group consisting of a subscriber specification information, a subscriber identity, a location data, a phone setting, a music content, a picture content, a video content, a message, a call record, and a game.

19. A system according to claim 16 wherein said communication device accesses said first mobile information over a link.

20. A system according to claim 16 wherein said communication device accesses said first mobile information across a network.

21. A system according to claim 20 wherein said network is selected from a group consisting of a wired network, a wireless network, a GSM network, a CDMA network, an ISDN network, an Ethernet network, a CATV network, a Wi-Fi network, a LAN, and a Bluetooth network.

22. A system according to claim 16 wherein said communication device is used to make changes to said first mobile information onto said database.

23. A system according to claim 16 wherein said communication device is used to enter new information to said first mobile information onto said database.

24. A system according to claim 16 wherein said communication device clears its memory of unsaved said at least one item of said first mobile information when the use of said communication device has ended.

25. A system according to claim 24 wherein methods of ending use of said communication device are selected from a group consisting of hanging up, pressing an END key, closing the top of a flip-top telephone, or issuing a voice command.

26. A system according to claim 16 wherein said display means comprises a display unit.

27. A system according to claim 26 wherein said plurality of identification information stored on said database is displayed on said display unit.

28. A system according to claim 16 wherein said first mobile information stored on said database is indexed such that said communication device is directed to a selected index of inquiry.

29. A system according to claim 16 wherein at least a portion of said first mobile information is temporarily uploaded to said memory means and used by said communication device to engage in communication.

30. A system according to claim 29 wherein said at least a portion of said first mobile information comprises a subscriber specification information necessary for the communication device to arrange phone communication.

31. A system according to claim 16 wherein said capturing at least one kind of identification parameter comprises entering a user name and password.

32. A system according to claim 16 wherein said capturing at least one kind of identification parameter comprises a biometric capturing device selected from a group consisting of DNA pattern recognition, body geometry feature recognition, skin pattern recognition, facial recognition, optical recognition, voice recognition, signature recognition, keystroke recognition, vascular pattern recognition, infrared identification, and ultraviolet recognition.

33. A computer-implemented method for accessing at least one mobile information stored on a database by a communication device, the method comprising:
 providing said at least one mobile information associated with an identification parameter stored on said database;
 providing a communication device comprising at least one memory means and a means for receiving at least one kind of identification parameter, wherein said identification parameter includes information regarding identifying each type of mobile information, wherein said communication device is associated with a first subscriber;
 receiving authentication information of a second subscriber, wherein said authentication information is transmitted from said communication device;
 receiving an identification parameter for associating said communication device with said second subscriber in response to authentication of said second subscriber from said database;
 preventing access by said communication device to second mobile information stored in said at least one memory means regarding said first subscriber;
 displaying via a display screen said received identification parameter for identifying said each type of said mobile information associated with said second subscriber stored on said database;
 selecting at least one of said identification parameter to create selected information;
 transmitting said selected information to said database;
 matching said selected information with said identification parameter stored on said database;
 accessing said at least one mobile information associated with said matched identification parameter by said communication device;
 storing at least one item of said at least one mobile information in said at least one memory means;
 communicating via said communication device with a third-party associated with information contained in said at least one item;
 transmitting automatically an update to said at least one item to said database; and
 deleting said at least one item associated with said second subscriber from said at least one memory means, wherein said communication device deletes said at least one item in response to terminating communication with each of said third-party and said database.

* * * * *